Nov. 24, 1936.  F. H. RICKERSON  2,062,108
MECHANICAL COUPLING
Filed June 7, 1934

INVENTOR
FRANK H. RICKERSON·
BY
ATTORNEY

Patented Nov. 24, 1936

2,062,108

UNITED STATES PATENT OFFICE 2,062,108

MECHANICAL COUPLING

Frank H. Rickerson, Chicago, Ill., assignor to Teletype Corporation, Chicago, Ill., a corporation of Delaware Application June 7, 1934, Serial No. 729,350

8 Claims. (Cl. 287—119)

The present invention relates to mechanical couplings and more particularly to couplings adapted to be used in connection with removable appliances such as crank arms.

A primary object of the present invention is to provide a simple and durable mechanical coupling having a detent action so as to render appliances quickly and easily applicable to or removable from a shaft or other connecting element.

In its preferred embodiment the present invention is shown as being incorporated with a removable crank arm such as is employed for manually rotating a platen shaft of a telegraph printing apparatus. The apparatus to which the present invention is particularly applicable is provided with a removable cover, a prerequisite to the removal of which the platen shaft crank arm must be taken off so that the cover side walls may be withdrawn over the end of the shaft.

The platen shaft is provided near its end with a perpendicularly extending anchor pin according to the well-known type of bayonet connections. The end of the shaft and the pin constitute the male section of the coupling or connection, the female section of which is comprised of a tubular extension integrally formed with a crank arm. A longitudinal groove of suitable width to receive the upstanding pin of the male section is provided in the tubular section, and near the end thereof there is an annular recess traversing said longitudinal groove. Within the annular recess and into the rearmost portion of the longitudinal groove there is received a spring retaining ring shaped to conform with the combined groove and recess and provided with a transverse opening or channel of irregular gauge. The channel is arranged to register with the groove of the tubular section and is narrowed at an intermediate portion thereof so as to resist the free passage of the upstanding pin when it attempts to travel toward the rearmost section of the groove. The result of its encountering the narrowed section of the channel causes sufficient resistance to the travel of the pin to provide a retainer or detent action so that when the pin is received beyond the narrowed portion of the channel, the spring tendencies of the annular ring retain it in position and through it the entire tubular section and integrally formed crank arm. The contour of the side walls which define the channel in the annular spring is such as to impart a perpendicular cam action so that with a reasonable manual effort the resistance to the retaining pin may be overcome and the handle easily applied or removed.

Figure 1:
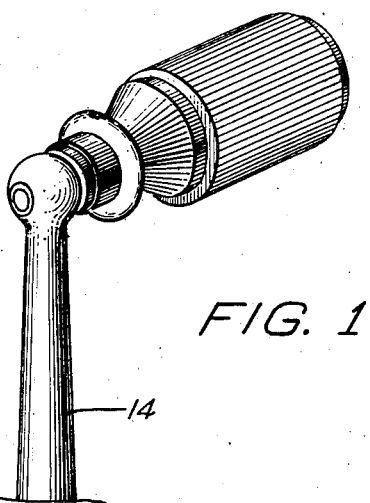

For a better understanding of this invention reference should be had to the accompanying drawing and to the following specification in which like reference characters designate similar parts throughout and in which, Fig. 1 is a fragmentary perspective view of a telegraph printing apparatus such as is more fully disclosed and described in United States Patent to Morton et al. No. 1,904,164, showing applied thereto a removable crank arm embodying the features of the present invention, Fig. 2 is a fragmentary plan elevation illustrating a mechanical connection similar to the one illustrated in Fig. 1, and Fig. 3 is a detail perspective view of the retainer ring embodied in the present invention and illustrated in connection with the structures featured in Figs. 1 and 2.

Referring now more particularly to the accompanying drawing, the reference character 11 indicates the end of a rotatable shaft which in accordance with the particular illustration is associated with a printing platen of the telegraph printing apparatus generally indicated 12. Near the free end of shaft 11 there is provided a perpendicularly extending anchor pin 13 integrally formed with the shaft and preferably of cylindrical shape. A crank arm 14 has integrally formed with it an enlarged tubular section 15. The shaft 11 is adapted to chamber within the tubular section 15 while the pin 13 is receivable within a longitudinal groove 16 extending part way of the enlarged section 15. Near its foremost end, Fig. 1, the section 15 is provided with an annular recess 17, best indicated in Fig. 2, which traverses the groove 16 and in conjunction therewith provides a trough or channel into which is received a retaining spring 18.

Figure 2:
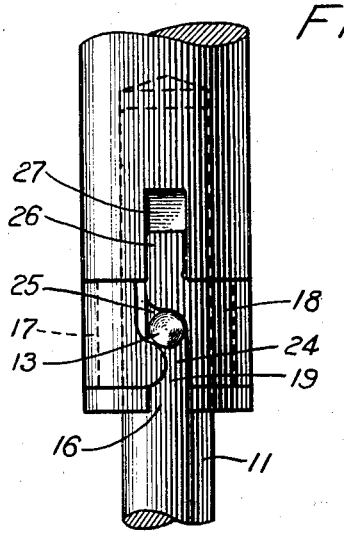
Figure 3:
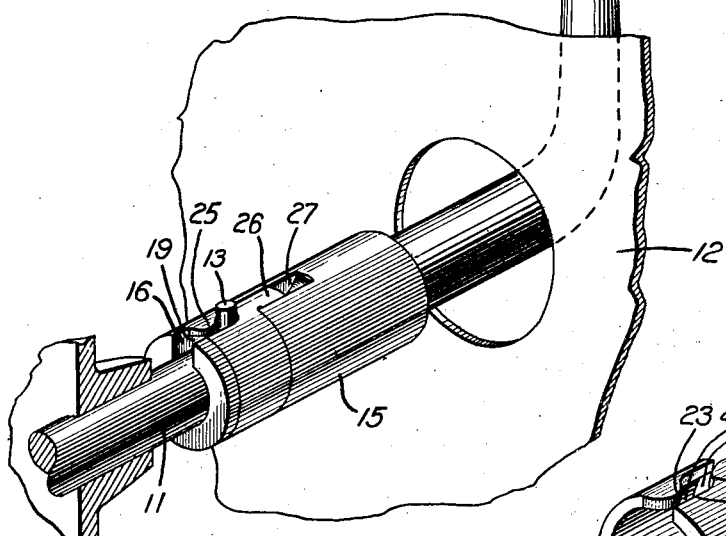
Figure 3:
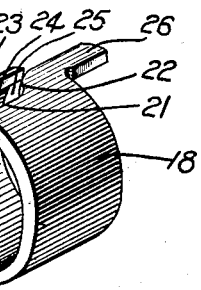

The main portion of spring 18 consists of an annular ring having a transverse opening or channel at 19, see Fig. 2. One side wall 21 of the opening 19 is comparatively straight until it reaches the remote extremity whence it merges with a reverse curve portion indicated 22. The other side wall 23 is of uneven contour, as best indicated in Fig. 2, defining a compounded curvature and in cooperation with the wall 21 affords a channel that is narrowed at about the point indicated 24, Fig. 2, and which widens again at about the point indicated 25, Figs. 2 and 3, so as to snugly receive at the last named point the pin 13 and to prevent by the spring tendencies of the ring 18 the free passage of pin 13 backwardly through the channel by reason of the obstruction of the narrowed or restricted portion 24. In passing the narrowed section 24, the pin 13 engaging the curvature of wall 23 cams away the wall section 23 against the tendencies of the annular spring 18 until it is received in the wider portion of the channel indicated at 25 where the clearance is of sufficient breadth to admit the full width of the pin 13.

When the spring 18 is positioned on the tubular section 15, a transversely extending projection 26 thereof extends into the rearmost portion of the groove 16, indicated 27 in Figs. 1 and 2, and serves thereby to lock the ring 18 in position against peripheral displacement.

To apply the crank arm 14 upon the shaft 11, the end of shaft 11 is inserted into the tubular opening of the enlarged portion 15 while the pin 13 is brought into radial alignment with the groove 16. By applying a slight pressure to the arm 14 the pin 13 is brought to encounter the side wall 23 and in cooperation with the inclined surfaces thereof, cams away the free end of ring 18 adjacent to side wall 23, thereby tending to widen the channel at point 24. After the pin 13 passes this point, it is received in a wider section of the channel indicated 25, where between the cooperating walls 21 and 23, the pin 13 is securely retained and through it the assembly, including crank arm 14. Thus the spring retaining element featured in Fig. 3 serves not only in lieu of the catch tooth ordinarily provided in the case of bayonet couplings, but by reason of its resiliency in both directions of cooperation it serves also in lieu of the spring element ordinarily provided to impart a resilient end thrust.

It should be noted that by means of this structure in contradistinction with other connections of this class; for example, the standard bayonet type connection, the wall section of the tube 15 is not materially weakened and that a secure connection is effected without the aid of cumbersome or protruding elements. On the contrary, the foregoing described coupling or mechanical connection consists of a strong, simple structure having smooth and graceful lines. The handle may be quickly and easily removed or applied with but slight pressure.

While the present invention has been explained and described in connection with a preferred embodiment thereof, it should be understood that numerous modifications and adaptations may be made without departing from the spirit or scope thereof. Accordingly, it is not intended to be limited by the specific language of the foregoing specification nor by the particular details illustrated in the accompanying drawing, but to be permitted instead a latitude of interpretation as indicated by the hereinafter appended claims.

What is claimed is:

1. In a mechanical connection, a section having a transversely extending pin, a section having a longitudinal channel for receiving said pin, and a retainer element comprising an annular spring member received in a recess of said channeled section and provided with a restricted transverse channel for cooperating with said pin.

2. A mechanical connection for effecting a quickly detachable union between two cooperating elements comprising a section formed with one of said elements, a section formed with the other of said elements, a perpendicularly extending pin provided in said first section, said other section having a longitudinal groove for cooperating with said pin, and an annular retaining element formed of spring material surrounding said grooved section and having an opening for imparting transverse stresses to said pin to resist its free ingress and egress into said longitudinal grooves.

3. In combination with a rotatable shaft, a detachable connecting element comprising first and second cooperating portions, a rigid projecting element carried by said first portion to be received longitudinally within a recess in said second portion, and a yieldable retaining ring having a transverse split therethrough for detenting the free ingress and egress of said projecting element within said recess.

4. A socket structure comprising a tubular receptacle, and means for detenting cooperating elements to be received in said socket comprising an encircling spring element affording a restricted channel between adjacent end portions thereof for impeding the free ingress or egress of said cooperating elements therewith.

5. In a mechanical coupling for affording union between longitudinally communicating elements, a terminus having a projection, a terminus having a longitudinal slot for receiving said projection; and a retaining element yieldable for resisting the free egress of said projection from said slot comprising an elastic ring having a transverse opening positioned in alignment with said slot.

6. In a mechanical connection, a section having a pin, a section having a channel for receiving said pin, and a yieldable retainer element surrounding said channeled section affording permissive ingress and egress of said pin within said channel without relative rotation of said sections.

7. In a mechanical coupling, a pair of connector members capable of longitudinal movement during conjunction, and means for detenting the operation of said members comprising an annular ring of elastic material transversely split to provide a recess and anchored to one of said members, and a detent element anchored to the other of said members and adapted to be received between the edges of said ring adjacent said recess.

8. A mechanical coupling including a driving element, a driven element, means for fitting said elements together longitudinally, means for preventing the relative rotation between said driving and driven elements, and a retaining member for yieldably resisting the disjunction of said elements comprising an elastic circlet transversely split and anchored to one of said elements and a projection anchored to the other of said elements to be received within said split.

FRANK H. RICKERSON.